United States Patent
Chen et al.

(10) Patent No.: US 7,542,282 B2
(45) Date of Patent: Jun. 2, 2009

(54) ELECTRONIC MODULE LOCKING AND EJECTING APPARATUS

(75) Inventors: Xiao-Zhu Chen, Shenzhen (CN); Ke Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/966,999

(22) Filed: Dec. 29, 2007

(65) Prior Publication Data

US 2009/0091893 A1  Apr. 9, 2009

(30) Foreign Application Priority Data

Oct. 9, 2007   (CN) .................. 2007 1 0201961

(51) Int. Cl.
   *G06F 1/16*   (2006.01)
   *H01R 13/62*  (2006.01)
(52) U.S. Cl. ........................ 361/685; 439/157
(58) Field of Classification Search ............... 361/685, 361/683, 684, 686; 439/157, 153, 159, 160
   See application file for complete search history.

(56) References Cited

U.S. PATENT DOCUMENTS

| | | | | |
|---|---|---|---|---|
| 6,027,350 A * | 2/2000 | Chen et al. | ................... | 439/159 |
| 6,142,801 A * | 11/2000 | Koseki et al. | ................ | 439/159 |
| 6,162,075 A * | 12/2000 | Hara et al. | .................. | 439/159 |
| 6,379,167 B1 * | 4/2002 | Zhang et al. | ................. | 439/157 |
| 6,814,597 B1 * | 11/2004 | Kao | ............................ | 439/159 |
| 7,048,560 B2 * | 5/2006 | Datan et al. | ................. | 439/160 |

* cited by examiner

*Primary Examiner*—Chandrika Prasad
(74) *Attorney, Agent, or Firm*—Frank R. Niranjan

(57) ABSTRACT

An electronic module locking and ejecting apparatus includes a carriage, a sliding bracket slidably attached in the carriage, an ejector pivotably mounted to the carriage, a first resilient member, and a second resilient member. A stopping lip is formed on the sliding bracket. The ejector includes an ejecting portion and a block extending therefrom, and a receiving notch is defined between the block and the ejector. The first resilient member is positioned between the carriage and the ejector and is configured for urging the ejecting portion of the ejector to eject an electronic module when the stopping lip is slidably entered into the receiving notch. The second resilient member is positioned between the carriage and the sliding bracket and is configured for urging the sliding bracket to slide relative to the carriage to make the stopping lip to slidably come out of the receiving notch.

16 Claims, 4 Drawing Sheets

ELECTRONIC MODULE LOCKING AND EJECTING APPARATUS

BACKGROUND

1. Field of the Invention

The present invention relates to electronic module locking and ejecting apparatuses, and more particularly to an electronic module locking and ejecting apparatus of a computer chassis.

2. Description of Related Art

A variety of storage devices such as, for example, hard disk drives, optical drives, and other equivalent devices are often used in computer systems. These storage devices may be coupled to and removed from the computer systems as a user's needs require by means of a securing apparatus. However, conventional securing apparatuses are complicated and unreliable.

What is desired, therefore, is an electronic module locking and ejecting apparatus for providing reliable installation and easy removal of the electronic module.

SUMMARY

An exemplary electronic module locking and ejecting apparatus includes a carriage, a sliding bracket slidably attached in the carriage configured for receiving an electronic module therein, an ejector pivotably mounted to the carriage, a first resilient member, and a second resilient member. A stopping lip and a pushing portion are formed on the sliding bracket. The ejector includes an ejecting portion and a block extending therefrom, and a receiving notch is defined between the block and the ejector configured for receiving the stopping lip of the sliding bracket. The first resilient member is positioned between the carriage and the ejector and is configured for urging the ejecting portion of the ejector to eject an electronic module when pushing the pushing portion of the sliding bracket to make the stopping lip of the sliding bracket to slidably enter into the receiving notch between the block and the ejector. The second resilient member is positioned between the carriage and the sliding bracket and is configured for urging the sliding bracket to slide relative to the carriage to make the stopping lip of the sliding bracket to slidably come out of the receiving notch between the block and the ejector and abut against the block of the ejector.

Other advantages and novel features of the present invention will become more apparent from the following detailed description of an embodiment when taken in conjunction with the accompanying drawings, in which:

DETAILED DESCRIPTION

Figure 1:
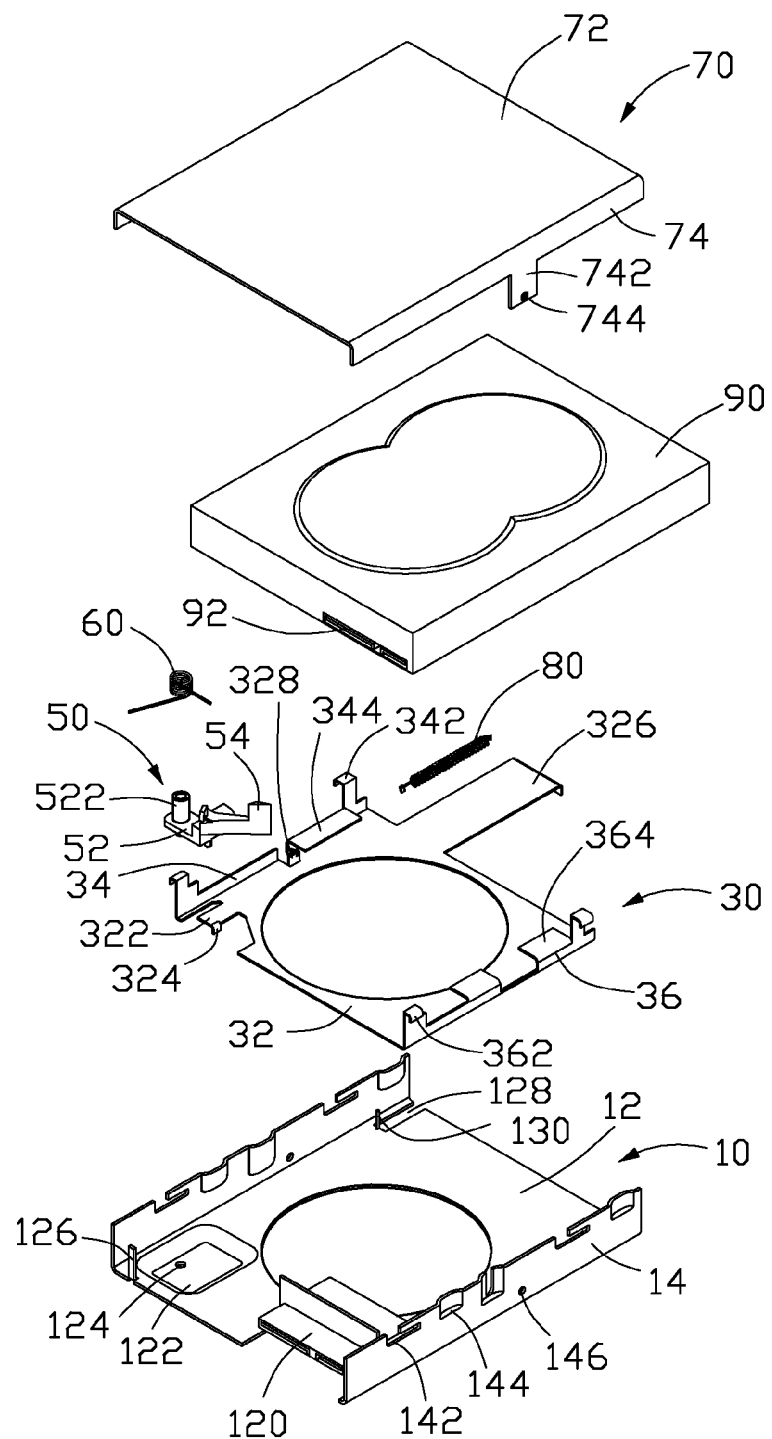
FIG. 1 is an exploded, isometric view of an electronic module locking and ejecting apparatus according to an embodiment, together with an electronic module, and the locking and ejecting apparatus including a carriage, a sliding bracket, an ejector, a cover, a first resilient member, and a second resilient member.
Figure 2:
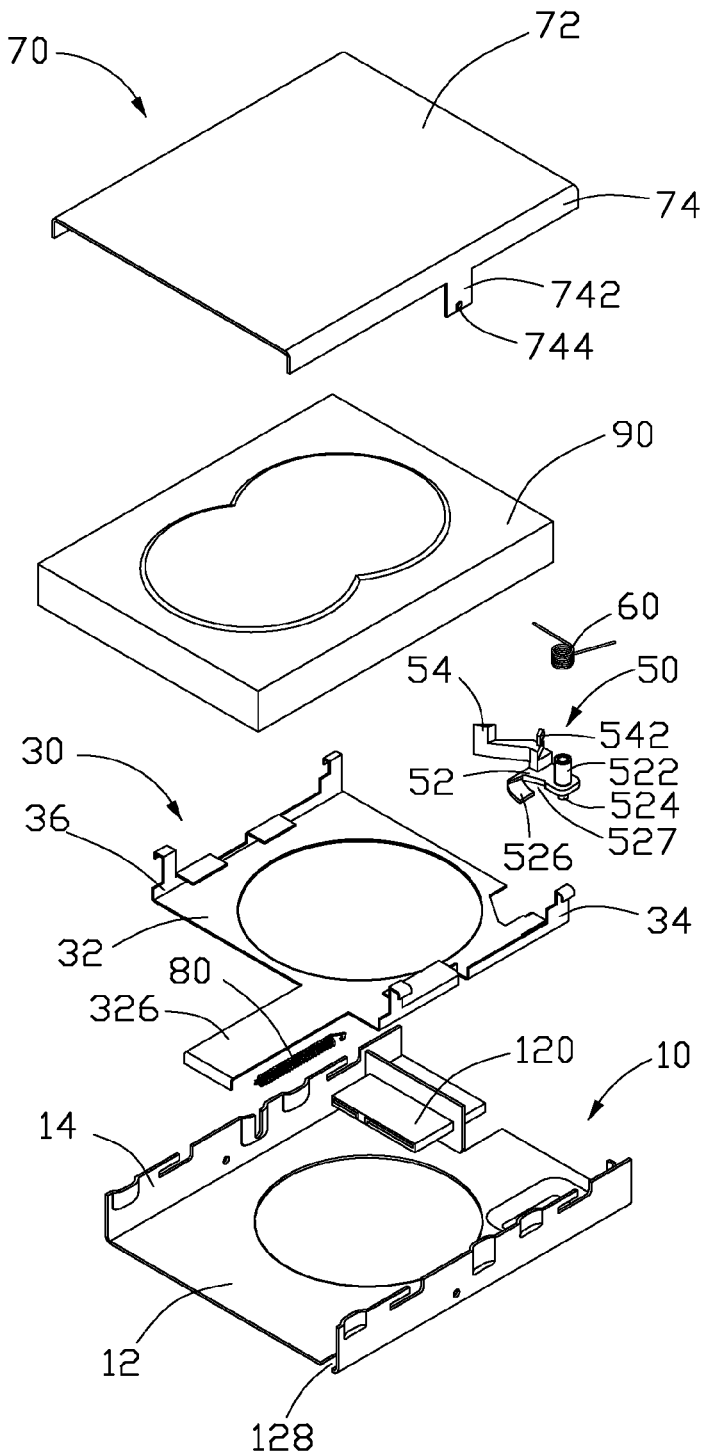
FIG. 2 is similar to FIG. 1, but viewed from another aspect.

Referring to FIGS. 1 and 2, in an embodiment, an electronic module locking and ejecting apparatus is secured in a computer chassis to hold an electronic module therein, such as a drive 90. An electrical connector 92 is set at a back of the drive 90. The locking and ejecting apparatus includes a carriage 10, a sliding bracket 30 slidably attached to the carriage 10, an ejector 50 pivotably mounted to the carriage 10, a cover 70 covering the carriage 10, a first resilient member, and a second resilient member.

The carriage 10 includes a rectangular bottom wall 12 and two elongated sidewalls 14 respectively bent upward from opposite sides of the bottom wall 12 in the same direction. A mating electrical connector 120 is located at a back end of the bottom wall 12 adjacent one of the sidewalls 14, and a depressed portion 122 is formed at the back end of the bottom wall 12 adjacent the other of the sidewalls 14. A pivoting hole 124 is defined in the depressed portion 122. An elongated tab 126 is bent upward from a back edge of the bottom wall 12 adjacent the depressed portion 122. An elongated slot 128 is defined at a front edge of the bottom wall 122. A positioning pin 130 is bent upward from an edge of the elongated slot 128. Two sliding grooves 142 are defined at a top edge of each sidewall 14. Each sliding groove 142 has a vertical entrance segment and a horizontal sliding segment communicating with the entrance segment, thereby being shaped like "L". A plurality of arcuate abutting portions 144 is formed inward in each sidewall 14. A hole 146 is defined in each sidewall 14.

The sliding bracket 30 includes a base plate 32 and two elongated flanges 34, 36 respectively bent upward from two opposite sides of the base plate 32 in the same direction. An extending arm 322 extends from a back edge of the base plate 32 adjacent the elongated flange 34. A stopping lip 324 is bent downward from an edge of the extending arm 322. A projection 328 is formed on a middle of the base plate 32 adjacent the elongated flange 34. An elongated pushing portion 326 extends out from a front edge of the base plate 32. A top of the elongated flange 34 is partially bent outward and downward to form two spaced sliding portions such as two inverted sliding hooks 342 in the embodiment, corresponding to the sliding grooves 142 of one of the sidewalls 14 of the carriage 10. A top of the elongated flange 36 is partially bent outward and downward to form two spaced sliding portions such as two inverted sliding hooks 362 in the embodiment, corresponding to the sliding grooves 142 of the other of the sidewalls 14 of the carriage 10. A support strip 344 is bent inward from the elongated flange 34 adjacent the projection 328 and spaced apart from the base plate 32. Two support strips 364 are bent inward from the elongated flange 36 and spaced apart from the base plate 32.

The ejector 50 includes a main body 52 and an ejecting portion 54 projecting out from the main body 52. A stopper 542 is formed on the ejecting portion 54. A post 522 and a pivoting shaft 524 respectively extend from a top and a bottom of the main body 52. An arcuate block 526 extends out from the main body 52, forming a receiving notch 527 between the arcuate block 526 and the main body 52.

The cover 70 includes a rectangular top portion 72 and two lateral walls 74 respectively bent downward from opposite edges of the top portion 72. A securing tongue 742 extends downward from each lateral wall 74. A through hole 744 is defined in each securing tongue 742, corresponding to the hole 146 of the corresponding sidewall 14 of the carriage 10.

Figure 3:
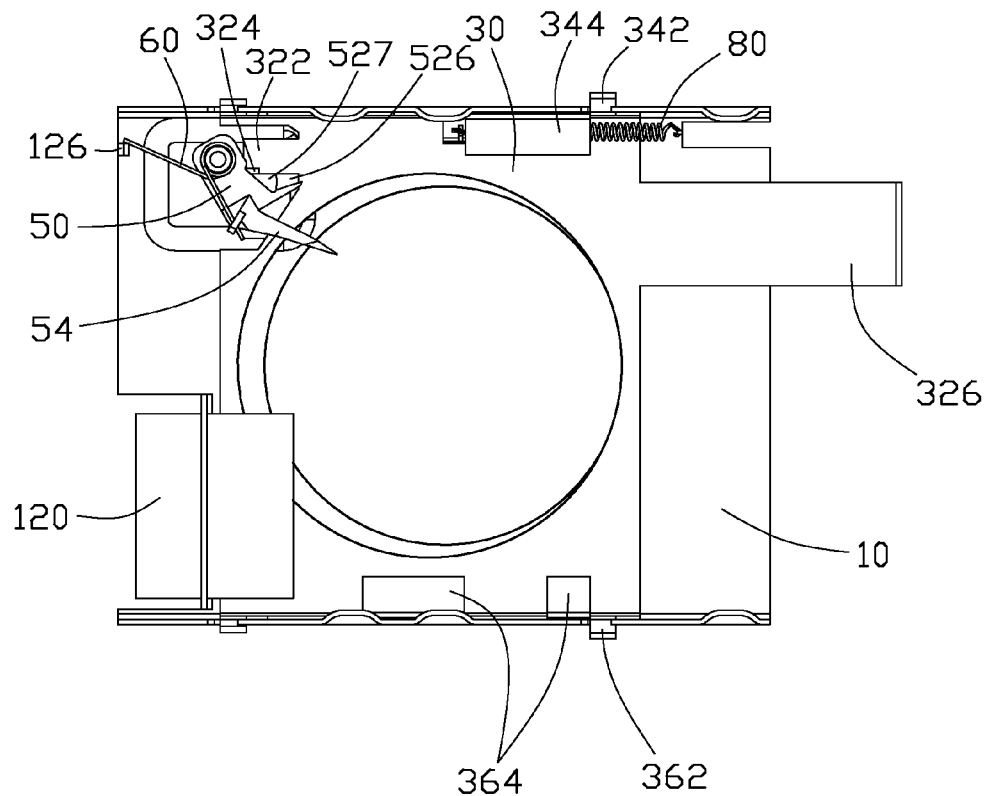
FIG. 3 is an assembled, top plan view of FIG. 1, but the electronic module and the cover unattached.
Figure 4:
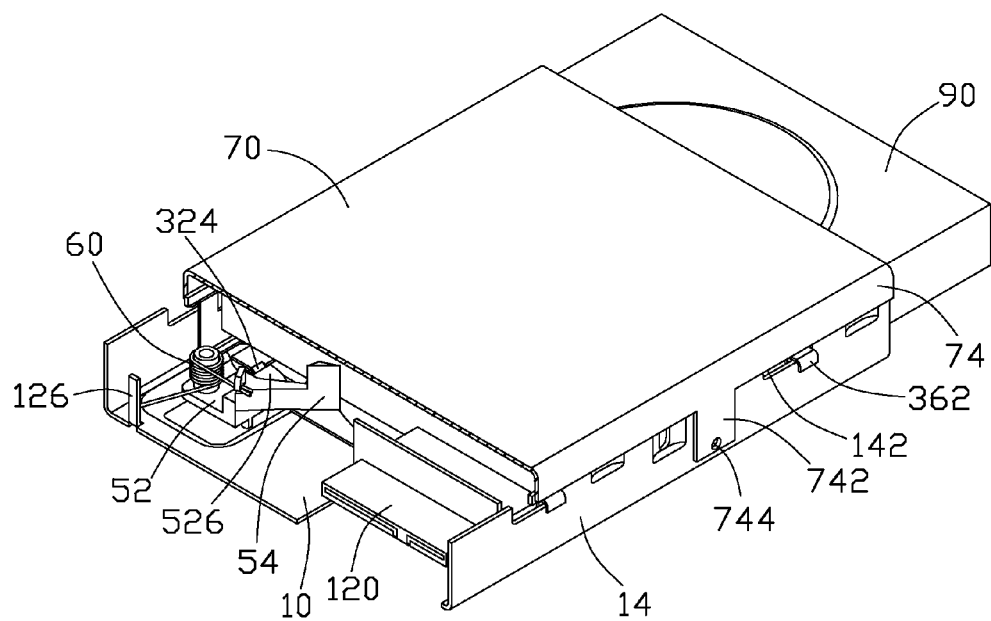
FIG. 4 is an assembled view of FIG. 1, with a portion of the cover being cut away.

Referring also to FIGS. 3 and 4, in assembly, the sliding bracket 30 is placed in the carriage 10, and the sliding hooks 342, 362 of the elongated flanges 34, 36 of the sliding bracket 30 are respectively slidably entered into the sliding grooves 142 of the sidewalls 14 of the carriage 10 through the corresponding entrance segments of the sliding grooves 142. The second resilient member such as an extension spring 80 is placed under the support strip 344 of the elongated flanges 34, and an end ring of the extension spring 80 is locked on the positioning pin 130 of the bottom wall 12 and the other end ring thereof is locked on the projection 328 of the base plate 32. The sliding bracket 30 is urged to slide relative to the carriage 10 by the extension spring 80, thereby the sliding hooks 342, 362 of the sliding bracket 30 are slid towards the sliding segments of the corresponding sliding grooves 142 of the carriage 10.

The ejector 50 is put in the depressed portion 122 of the carriage 10, and the pivoting shaft 524 of the ejector 50 is pivotably inserted into the pivoting hole 124 of the depressed portion 122. A coil portion of the first resilient member such as a torsion spring 60 is placed around the post 522 of the ejector 50, and an end pin of the torsion spring 60 abuts against the elongated tab 126 of the carriage 10 and the other end pin thereof is locked and placed under the stopper 542 of the ejector 50. Thus the ejector 50 is pivotably mounted to the bottom wall 12 of the carriage 10. The torsion spring 60 urges the ejector 50 to pivot around the pivoting shaft 524 thereof in a first direction and the arcuate block 526 of the ejector 50 is slid under the extending arm 322 of the sliding bracket 30. When the stopping lip 324 of the extending arm 322 clears the distal end of the arcuate block 526, the stopping lip 324 enters into the receiving notch 527 between the arcuate block 526 and the main body 52. Thus the sliding bracket 30 is driven to slide inward relative to the carriage 10 to a first position where the stopping lip 324 comes to a bottom of the receiving notch 527, and the extension spring 80 is deformed.

The cover 70 is positioned on the carriage 10, and the lateral walls 74 of the cover 70 abut against the corresponding sidewalls 14 of the carriage 10 and the through holes 744 of the securing tongue 742 are aligned with the corresponding holes 146 of the sidewalls 14. Two fasteners such as screws (not shown) are engaged in the through holes 744 and the corresponding holes 146, thereby the cover 70 is mounted to the carriage 10. Two edges of the lateral walls 74 of the cover 70 close the corresponding entrance segments of the sliding grooves 142 to prevent the sliding hooks 362 of the sliding bracket 30 from escaping out of the corresponding sliding grooves 142.

In use, the drive 90 is pushed into the locking and ejecting apparatus from the front of the carriage 10. The drive 90 is supported on the support strips 344, 364 of the sliding bracket 30 and sandwiched between the abutting portions 144 of the two sidewalls 14 thereof. When the back of the drive 90 abuts on the ejecting portion 54 of the ejector 50, the drive 90 urges the ejector 50 to rotate around the pivoting shaft 524 thereof in a second direction and the torsion spring 60 is deformed. The arcuate block 526 is slid out of the extending arm 322 of the sliding bracket 30 and the stopping lip 324 of the extending arm 322 is slid out of the receiving notch 527 between the arcuate block 526 and the main body 52. The deformed extension spring 80 urges the sliding bracket 30 to slide towards the front of the carriage 10 via the sliding of the sliding hooks 342, 362 in the corresponding sliding grooves 142. The stopping lip 324 of the extending arm 322 abuts against the distal end of the arcuate block 526 to stop the ejector 50 continuing pivoting. The sliding bracket 30 is slid outward relative to the carriage 10 to a second position, and the front edge of the sliding bracket 30 and the sliding hooks 344, 364 thereof respectively abuts against the positioning pin 130 and the ends of the sliding grooves 142 of the carriage 10. The electrical connector 92 of the drive 90 is electrically connected with the mating electrical connector 120 of the carriage 10. Thus the drive 90 is held in the locking and ejecting apparatus.

In the removal of the drive 90, the pushing portion 326 of the sliding bracket 30 is pushed toward the carriage 10. The extension spring 80 is deformed. The stopping lip 324 of the extending arm 322 is slid towards the ejector 50. When the stopping lip 324 of the extending arm 322 clears the distal end of the arcuate block 526, the deformed torsion spring 60 urges the ejector 50 to rotate around the pivoting shaft 524 in the first direction. The arcuate block 526 of the ejector 50 is slid under the extending arm 322. The stopping lip 324 of the extending arm 322 enters the receiving notch 527 between the arcuate block 526 and the main body 52, and the sliding bracket 30 comes back to the first position. The drive 90 is ejected out of the carriage 10 by the ejecting portion 54 of the ejector 50 along the support strips 344, 364 of the sliding bracket 30, and the electrical connector 92 of the drive 90 is disengaged from the mating electrical connector 120 of the carriage 10. The drive 90 is ready to be taken out of the locking and ejecting apparatus.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic module locking and ejecting apparatus comprising:
   a carriage;
   a sliding bracket slidably attached in the carriage configured for receiving an electronic module therein, the sliding bracket forming a stopping lip and a pushing portion;
   an ejector pivotably mounted to the carriage, the ejector comprising an ejecting portion, a main body and a block extending therefrom, a receiving notch being defined between the block and the main body configured for receiving the stopping lip of the sliding bracket;
   a first resilient member being positioned between the carriage and the ejector configured for urging the ejecting portion of the ejector to eject an electronic module when pushing the pushing portion of the sliding bracket to make the stopping lip of the sliding bracket to slidably entered into the receiving notch between the block and the ejector; and
   a second resilient member being positioned between the carriage and the sliding bracket configured for urging the sliding bracket to slide relative to the carriage to make the stopping lip of the sliding bracket to slidably come out of the receiving notch between the block and the ejector and abut against the block of the ejector.

2. The electronic module locking and ejecting apparatus as described in claim 1, wherein a pivoting hole is defined in the carriage, and a pivoting shaft projects from the ejector and pivotably inserted in the pivoting hole of the carriage.

3. The electronic module locking and ejecting apparatus as described in claim 2, wherein a tab is bent from the carriage adjacent the pivoting hole thereof, a post and a stopper extend from the ejector, and a coil portion of the first resilient member is placed around the post of the ejector and two end pins thereof are respectively locked on the tab of the carriage and the stopper of the ejector.

4. The electronic module locking and ejecting apparatus as described in claim 3, wherein the first resilient member is a torsion spring.

5. The electronic module locking and ejecting apparatus as described in claim 1, wherein a positioning pin and a projection respectively extend from the carriage and the sliding bracket, and an end ring of the second resilient member is locked on the positioning pin of the carriage and the other end ring thereof is locked on the projection of the sliding bracket.

6. The electronic module locking and ejecting apparatus as described in claim 5, wherein the second resilient member is an extension member.

7. The electronic module locking and ejecting apparatus as described in claim 1, wherein the carriage comprises two sidewalls, at least one sliding groove is defined in each sidewall, and at least two sliding portions are formed on the sliding bracket and slidably received in said two sliding grooves of the carriage.

8. The electronic module locking and ejecting apparatus as described in claim 7, wherein said at least two sliding portions are two inverted sliding hooks bent outward and downward from two opposite flanges of the sliding bracket respectively.

9. The electronic module locking and ejecting apparatus as described in claim 7, wherein each of said two sliding grooves of the carriage has an entrance segment defined at an edge of the corresponding sidewall thereof, and said at least two sliding portions of the sliding bracket are respectively slidably entered said corresponding sliding grooves of the carriage through the entrance segments of said sliding grooves.

10. An electronic apparatus assembly comprising:
an electronic module with an electrical connector;
a carriage with a mating electrical connector for mating with the electrical connector of the electronic module;
a sliding bracket slidably attached in the carriage for receiving the electronic module therein, the sliding bracket forming a stopping lip and a pushing portion;
a cover positioned on the carriage for enclosing the electronic module;
an ejector pivotably mounted to the carriage, the ejector comprising an ejecting portion, a main body and a block extending therefrom, a receiving notch being defined between the block and the main body configured for receiving the stopping lip of the sliding bracket; and
a first resilient member and a second resilient member being respectively positioned between the carriage and the ejector and the carriage and the sliding bracket;
wherein when the electronic module is pushed inward the sliding bracket, the electronic module urges the ejecting portion of the ejector to pivot, thereby the first resilient member being deformed, the block of the ejector abuts against the stopping lip of the sliding bracket and the electrical connector of the electronic module is mated with the mating electrical connector of the carriage, when pushing the pushing portion of the sliding bracket to slide relative to the carriage, the second resilient member is deformed and the stopping lip of the sliding bracket is slidably entered into the receiving notch between the block and the ejector, the first resilient member urges the ejecting portion of the ejector to eject the electronic module out of the carriage, and the electrical connector of the electronic module is disengaged from the mating electrical connector of the carriage.

11. The electronic apparatus assembly as described in claim 10, wherein a pivoting hole is defined in the carriage, and a pivoting shaft projects from the ejector and pivotably inserted in the pivoting hole of the carriage.

12. The electronic apparatus assembly as described in claim 11, wherein a tab is bent from the carriage adjacent the pivoting hole thereof, a post and a stopper extend from the ejector, and a coil portion of the first resilient member is placed around the post of the ejector and two end pins thereof are respectively locked on the tab of the carriage and the stopper of the ejector.

13. The electronic apparatus assembly as described in claim 10, wherein a positioning pin and a projection respectively extend from the carriage and the sliding bracket, and an end ring of the second resilient member is locked on the positioning pin of the carriage and the other end ring thereof is locked on the projection of the sliding bracket.

14. The electronic apparatus assembly as described in claim 10, wherein the carriage comprises two sidewalls, at least one sliding groove is defined in each of the sidewalls, and at least two sliding portions are formed on the sliding bracket and slidably received in said corresponding sliding grooves of the sidewalls of the carriage.

15. The electronic apparatus assembly as described in claim 14, wherein each of said two sliding grooves of the carriage has an entrance segment defined at an edge of the corresponding sidewalls thereof, and said at least two sliding portions of the sliding bracket are respectively slidably entered said corresponding sliding grooves of the carriage through the entrance segments of said sliding grooves.

16. The electronic apparatus assembly as described in claim 15, wherein the cover comprises two lateral walls for closing the corresponding entrance segments of said two sliding grooves of the carriage.

* * * * *